July 31, 1951 J. R. SPEER 2,562,749
GAUGE FOR MEASURING CHANGES IN CIRCUMFERENCE
Filed Dec. 12, 1944
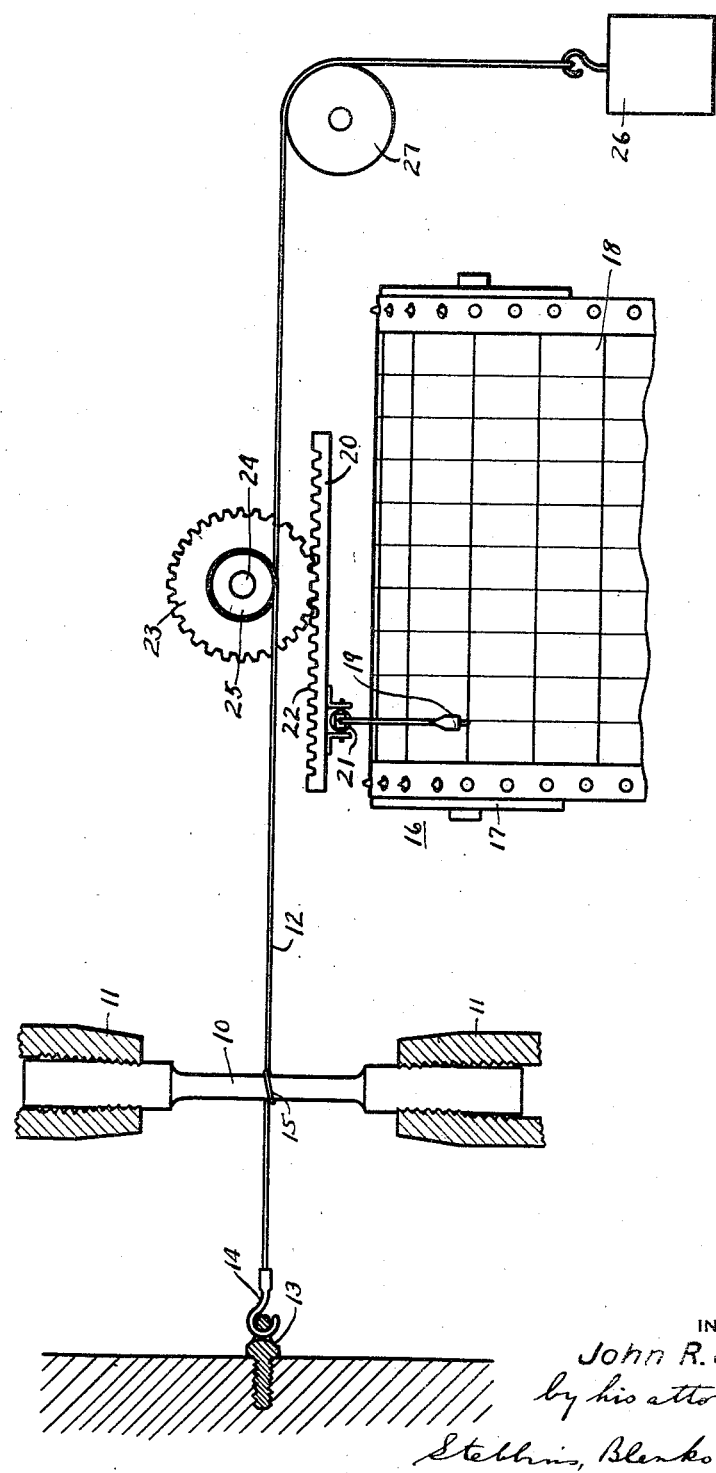
INVENTOR
John R. Speer
by his attorneys
Stebbins, Blenko & Webb Patented July 31, 1951

2,562,749

UNITED STATES PATENT OFFICE 2,562,749

GAUGE FOR MEASURING CHANGES IN CIRCUMFERENCE

John R. Speer, Pittsburgh, Pa., assignor to Jones & Laughlin Steel Corporation, Pittsburgh, Pa., a corporation of Pennsylvania Application December 12, 1944, Serial No. 567,804

3 Claims. (Cl. 73—95)

This invention relates generally to apparatus for testing the strength of materials and, in particular, to a device for measuring the reduction in cross-sectional area of a specimen as it contracts upon elongation under a tension test.

Conventional practice in the testing of various materials for tensile strength involves subjecting a specimen to a progressively increasing tension load and measuring the elongation resulting from various loads. A stress-strain diagram plotted from the data taken during the test affords a readily comprehended picture of the characteristics of the material under test in respect to tensile strength, ductility, etc. To avoid the labor and time required for manually plotting stress-strain diagrams, autographic recorders have been developed which automatically draw the diagram as the tension test proceeds (Templin, "An automatic autographic extensometer for use in tension tests of materials," Proc. A. S. T. M., 1932, v. 32, pp. 783-792). The diagrams produced by these recorders, however, are not strictly accurate because there is no provision for taking account of the reduction in sectional area of the specimen which commences as soon as the elongation of the specimen and becomes very pronounced above the yield point thereof. In other words, the tension load applied to the specimen at any point during the test is assumed to be distributed uniformly over the original sectional area of the specimen while, as a matter of fact, this area is progressively reduced as elongation continues. While a true stress-strain diagram may be plotted manually, if appropriate measurements are made during the progress of the test to make possible calculation of the actual area at the plane of minimum section, the advantage of the automatic recorder is sacrificed by the necessity for making and recording measurements manually, then calculating values and correcting the diagram produced by the recorder.

I have invented an apparatus for continuously measuring and indicating or recording the reduction in sectional area of a specimen under tension test as elongation thereof occurs with the increasing load. The apparatus is readily adaptable to the control of various forms of recording apparatus previously known, whereby they may be used to produce a true stress-strain diagram which takes account of the reduction in area, instead of a theoretical diagram based on the false assumption that the original area of the specimen remains undiminished throughout the test. In a preferred embodiment, the invention comprises a fine wire or thread having one end secured to a fixed anchorage and the other end to a tensioning means. The intermediate portion of the wire is given a turn about the portion of the specimen at which the most marked reduction in area may be expected to occur. The portion of the wire between the specimen and the tensioning means is secured to an indicator or recorder, preferably through movement-multiplying means so as to provide an indication or record of the reduction in the sectional area of the specimen as it is elongated. Any such reduction permits the turn of the wire about the specimen to contract whereupon the tension applied continuously to the end of the wire causes a corresponding movement of the indicator or recorder.

Further details and novel features of the invention will become apparent from the following complete description and explanation which refer to the accompanying drawing. In the drawing, the single figure is a diagrammatic elevation showing the apparatus of my invention applied to a standard specimen of steel or other metal being subjected to a tension test.

In the drawing, the test specimen indicated at 10 is engaged at its ends by the gripper jaws 11 of a conventional testing machine. A fine wire or thread 12 has one end secured to a fixed anchorage such as the screw eye 13, conveniently by means of a hook 14 to which the end of the wire is fastened. The wire 12 is given a turn about the portion of the specimen at which the maximum reduction in area is most likely to occur, as indicated at 15.

A recorder 16 of any suitable type disposed adjacent the testing machine includes a drum 17 for advancing a continuous chart or record strip 18 and a curve-drawing pen 19 carried by a slide bar 20. The drum 17 is journaled in bearings and provided with a suitable driving mechanism, the details of which are known. The slide bar 20 is mounted in suitable guides for movement parallel to the axis of the drum 17. A fountain 21 contains a supply of ink and communicates with the pen 19.

Rack teeth are formed on the upper edge of the bar 20 as at 22. A pinion 23 mounted on a shaft 24 journaled in suitable bearings (not shown) meshes with the rack teeth for effecting longitudinal movement of the pen 19. A pulley 25 is mounted on the shaft 24 and the wire 12 is given a turn therearound so that any slack occurring in the wire 12 between the eye 13 and the recorder will permit limited rotation of the pulley and pinion. Such rotation may be effected by any suitable means for tensioning the wire. One such means illustrated in the drawing includes a weight 26 attached to the wire 12 beyond the pulley 25, the intermediate portion of the wire being trained around a pulley 27.

It will be apparent that as the specimen 10 "necks in" or contracts with elongation, the turn 15 in the wire 12 will decrease in size, being maintained snug against the surface of the specimen by the tension in the wire. Any decrease in the size of the turn, of course, permits movement of the wire beyond it under the existing tension, with accompanying rotation of the pulley 25 and pinion 23. The pen 19 is, of course, correspondingly advanced from its initial position. The actuating train including the pulley 25, pinion 23 and rack 22 constitute a movement-multiplying means, the multiplying factor being the ratio of the pitch diameter of the pinion to the diameter of the pulley. The contraction of the specimen under tension is thus magnified for easy observation on the chart 18.

The drum 17 may be driven at a constant speed or may be actuated by known means, in accordance with the load applied to the specimen or the elongation of the latter. If the chart is driven in accordance with the elongation of the specimen, the pen 19 will draw a curve showing the reduction of area with elongation and from this curve and the conventional stress-strain diagram obtained in the same test from an autographic recorder of the known type, the true stress-strain diagram may be constructed quickly and easily. A more convenient arrangement is to have the pen 19 mounted on the conventional autographic recorder so as to draw a curve extending between the same transverse lines on the chart 18 as the conventional stress-strain diagram. From the two curves resulting, the points on the true stress-strain diagram may then be located rapidly.

If it is desired merely to obtain a curve of reduction of area with applied load, the pen 19 may be actuated in accordance with the load applied by known means, and the drum 17 actuated by the wire 12 in the same manner as illustrated for the pulley 25.

It will be appreciated that the length of the turn 15 about the specimen at any given time is a measure of the circumference at the plane of section at which the turn is disposed. Since the specimen usually maintains substantially circular shape in section as it contracts, the apparatus may be calibrated in terms of the sectional area without exceeding permissible limits of error by means of the formula $$A = \frac{C^2}{4\pi}$$

where A is the area and C is the circumference. It will also be understood that the turn 15 must be disposed at the sectional plane where the reduction in area is a maximum. This is not difficult to accomplish since the plane of maximum reduction of area is usually about the center of the reduced mid-portion of the specimen. As an extra precaution, the gage portion of the specimen may be turned to a slightly smaller diameter adjacent the median sectional plane within the dimensional limits established by standard testing specifications, thus practically insuring that the maximum reduction and final break will take place there so that the turn of the wire may be correspondingly positioned. Since the turn of the wire has sliding movement on the surface of the specimen, a suitable lubricant may be applied to cause smooth operation.

It will be apparent that the invention is characterized by an important advantage over conventional recording devices for use with specimens under test for tensile strength as known heretofore. The principal advantage has already been mentioned, viz., that by the use of the apparatus, it is possible to construct a true stress-strain diagram quickly and easily without extended calculations. In addition, the device makes it possible to obtain automatically curves of reduction in area with increasing load. The apparatus is simple and relatively inexpensive to construct and the use thereof does not involve any special difficulty or added complications.

It will be understood that while I have illustrated and described but a preferred embodiment of the invention, the construction and arrangement thereof may be altered materially from the details of the disclosure without departing from the spirit of the invention or the scope of the appended claims.

I claim:

1. Tension testing apparatus comprising means including a pair of progressively separable gripper elements for subjecting a test specimen to tensile stress and strain, and means for measuring the circumference of a specimen held between the gripper elements as the gripper elements are drawn apart, said measuring means comprising a flexible but normally nonextensible elongated member adapted to be wrapped closely around a specimen between the gripper elements, anchoring means connected to one part of the elongated member, means connected to another part of the elongated member to maintain tension on the elongated member and to take up the slack resulting from reduction in circumference of a specimen as it draws down under tensile testing, and means actuated by movement of said other part of the elongated member to indicate the amount of slack which is taken up in the said other part of the elongated member as a specimen draws down while being pulled between the gripper elements, the amount of said slack being a measure of the reduction of circumference of a specimen as it is drawn between the gripper elements.

2. Tension testing apparatus comprising means including a pair of progressively separable gripper elements for subjecting a test specimen to tensile stress and strain, and means for measuring the circumference of a specimen between the gripper elements as the gripper elements are drawn apart, said measuring means comprising a flexible but normally non-extensible elongated member adapted to be wrapped closely around a specimen between the gripper elements, anchoring means connected to one part of the elongated member, means connected to another part of the elongated member to maintain tension on the elongated member and to take up slack resulting from reduction in circumference of a specimen as it draws down under tensile testing, a rotatably mounted cylindrical member disposed between said last-mentioned means and the position of a specimen between the gripper elements and adapted to have the said other part of the elongated member wrapped therearound to rotate said cylindrical member as slack is taken up in the elongated member, an indicator and means connecting the cylindrical member to move the indicator, whereby reduction of circumference of a specimen between the gripper elements rotates the cylindrical member and causes the indicator to move and thereby indicate the reduction of circumference of a specimen as it is drawn between the gripper elements.

3. A method of tension testing a specimen comprising gripping spaced portions of the specimen and drawing said portions apart, wrapping a flexible but normally inextensible elongated member around the specimen between said gripped portions, anchoring a portion of the elongated member extending in one direction away from the specimen, maintaining tension and taking up slack in another portion of the elongated member extending in the opposite direction away from the specimen, and measuring the amount of slack taken up as the specimen is subjected to increasing tension between said gripped portions thereby obtaining a measure of the reduction of circumference of the specimen as a result of tensile action.

JOHN R. SPEER.

REFERENCES CITED

The following references are of record in the file of this patent:

UNITED STATES PATENTS

| Number | Name | Date |
| --- | --- | --- |
| 399,676 | Leuner | Mar. 19, 1889 |
| 1,356,804 | Brewer | Oct. 26, 1920 |
| 1,540,378 | Wasson | June 2, 1925 |
| 1,839,434 | Whitman | Jan. 5, 1932 |
| 2,050,106 | Lorig et al. | Aug. 4, 1936 |
| 2,102,080 | Kinley | Dec. 14, 1937 |

OTHER REFERENCES

Batson and Hyde, "Mechanical Testing," volume I, sec. 140, pages 214–215, and sec. 121 (page 185), published by Chapman & Hall, Ltd., London, England, 1922.